United States Patent
Wyatt et al.

(10) Patent No.: US 11,413,915 B1
(45) Date of Patent: Aug. 16, 2022

(54) TIRE RELEASING IMPLEMENT

(71) Applicants: Althea Wyatt, Middlesboro, KY (US); Kenneth Sweat, Lafayette, IN (US)

(72) Inventors: Althea Wyatt, Middlesboro, KY (US); Kenneth Sweat, Lafayette, IN (US)

( * ) Notice: Subject to any disclaimer, the term of this patent is extended or adjusted under 35 U.S.C. 154(b) by 343 days.

(21) Appl. No.: 16/676,803

(22) Filed: Nov. 7, 2019

(51) Int. Cl.
*B60C 25/01* (2006.01)
*B25B 27/00* (2006.01)

(52) U.S. Cl.
CPC ........ *B60C 25/015* (2013.01); *B25B 27/0035* (2013.01)

(58) Field of Classification Search
CPC ....... B60C 25/00; B60C 25/015; B60C 25/13; B60C 25/02; B25B 27/0035
USPC ............. 157/1.17, 1.2, 1.24, 1.3, 11
See application file for complete search history.

(56) References Cited

U.S. PATENT DOCUMENTS

| | | | |
|---|---|---|---|
| 4,527,607 A | 7/1985 | Gaither | |
| 5,363,897 A * | 11/1994 | Branch | B60C 25/02 157/1.17 |
| 7,426,953 B2 | 9/2008 | Baker et al. | |
| 7,866,365 B2 * | 1/2011 | Ochoa | B60C 25/04 157/1.3 |
| 9,731,565 B2 * | 8/2017 | Scott | B60C 25/015 |
| 2013/0269880 A1 * | 10/2013 | Corghi | B60C 25/0524 157/1.24 |

OTHER PUBLICATIONS

Little Buddy Manual Bead Breaker. Product Listing [online]. Copyright 1996-2019 Unique Truck Equipment, Inc. [retrieved on Jun. 6, 2019]. Retrieved from the Internet: <URL: https://www.uniquetruck.com/product/16581/little-buddy-manual-bead-breaker?affiliateID=10056&gclid=Cj0KEQjw8-LnBRCyxtfMI-Cbu48BEiQA6eUMGmJ8CGEyKHHoJ6NumEJMChZipB2bU4sji5lioKt8EPoaAqsy8P8HAQ>.
BeadBuster All-Purpose Tire Bead Breakers XB-455. Product Listing [online]. Copyright 2019 by Autosales, Incorporated dba Summit Racing Equipment [retrieved on Jun. 6, 2019]. Retrieved from the Internet: <URL: https://www.summitracing.com/parts/bbu-xb-455?seid=srese1&gclid=Cj0KEQjw8-LnBRCyxtfMI-Cbu48BEiQA6eUMGpKxnp-3tTnp6YRdzHWGvvLRXp7SQG95YcmRuMp5KrkaAqkQ8P8HAQ>.
How to Get a Tire Off a Rim. Article [online]. wikiHow.com [Co-authored by wikiHow Staff; updated: Sep. 12, 2019; retrieved on Jun. 6, 2019]. Retrieved from the Internet: <URL: https://www.wikihow.com/Get-a-Tire-Off-a-Rim>.
How to Use a Manual Tire Changer—Harbor Freight Video [online]. YouTube.com [Published: Nov. 25, 2014; retrieved on Jun. 6, 2019]. Retrieved from the Internet: <URL: https://www.youtube.com/watch?v=_J_2SD-snd0>.
Removing and Replacing a Tire on the Rim With Manual Tools. Video [online].YouTube.com [Published: Feb. 16, 2014; retrieved on Jun. 6, 2019]. Retrieved from the Internet: <URL: https://www.youtube.com/watch?v=kklnfjbMmiY>.

* cited by examiner

*Primary Examiner* — Monica S Carter
*Assistant Examiner* — Alberto Saenz
(74) *Attorney, Agent, or Firm* — Cramer Patent & Design, PLLC; Aaron R. Cramer

(57) ABSTRACT

A tire releasing implement has a lower portion, a center portion, a base, and an upper portion. The upper portion has a slot located at a first end and an aperture located at a second end. The implement is configured to be secured to the wheel of a vehicle, such that the lower portion is capable of engaging a tire and removing the tire from a rim when the vehicle is lowered.

19 Claims, 7 Drawing Sheets

TIRE RELEASING IMPLEMENT

RELATED APPLICATIONS

None.

FIELD OF THE INVENTION

The present invention relates generally to a tire releasing implement.

BACKGROUND OF THE INVENTION

As anyone who performs a lot of physical work will attest, nothing beats having the proper tool for a job. The proper tool can save time, save money, produce a higher quality job, reduce damage to equipment, and provides for the increased safety of the worker. Each field of physical work has its own type of specialty tools, each performing a specialized task. One particular type of unique work that is also common in many lines of work is the removal of a pneumatic tire from a rim. While tire repair shops have dedicated equipment that makes quick work of such tasks, those in a home environment or in another do-it-yourself situation do not have such luxury. As such, they will often resort to other ad hoc solutions which will likely take more time at best and sacrifice safety at worst. Accordingly, there exists a need for a means by which pneumatic tires can be easily removed under almost any situation in a manner that is safe, fast, and foolproof. The development of the tire releasing implement fulfills this need.

SUMMARY OF THE INVENTION

In view of the foregoing references, the inventor recognized the aforementioned inherent problems and observed that there is a need for a tire releasing implement comprises a base extending rearwardly from a terminal bottom edge of a lower portion, a center portion comprising a majority of the tire releasing implement that is generally rectangular in cross-section and an upper portion including a first upper side and a second upper side. The upper portion is delineated by a bisecting longitudinal axial centerline passing through the tire releasing implement.

The tire releasing implement also comprises a planar gusset which is affixed between an upper surface of the base and a rear surface of the tire releasing implement at the center portion, an aperture which is located adjacent to an upper outer corner of the second upper side and is sized to enable passage of a lug of a wheel therethrough and a slot which is located on the outer edge of the first upper side that extends inward to the delineation between the first upper side and the second upper side. The lower portion is depending downward from the center portion and has a pair of sides that tapers inward and terminates at a smaller width than the center portion.

The first upper side may be to the right of a longitudinal axial bisecting centerline of the tire releasing implement and the second upper side may be to the right thereof. The upper edge of the upper portion may taper down in height from an upper outer corner of the second upper side to a first intermediate point and then may taper upward at a smaller angle to a second intermediate point. The upper edge of the upper portion may then run parallel to the bottom edge of the lower portion as it terminates at the upper corner of the first upper side.

The lower portion, the base, the center portion and the upper portion may each be planar. The planar gusset may be located at a bisecting axial centerline of the base and is intended to provide structural rigidity to the tire releasing implement when in use. The planar gusset may have a similar thickness as the tire releasing implement. A bottom inner edge of the slot may be curvilinear to provide guided passage of the lug of the wheel therethrough. The corners of the first upper side, second upper side, and the slot are gently rounded. The tire releasing implement may assist in removing a tire from a rim after the tire has been removed from the wheel of a vehicle. The tire releasing implement may be a unitary structural element. The unitary structural element may include an upper part of the lower portion that transitions into a lower part of the center portion. The upper part of the center portion may transition into a lower part of the upper portion. The tire releasing implement may be a hardened metallic fabrication which in turn may be carbon steel or stainless steel. The tire releasing implement may be seven inches in height, four inches in width, and one-quarter inch in thickness.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
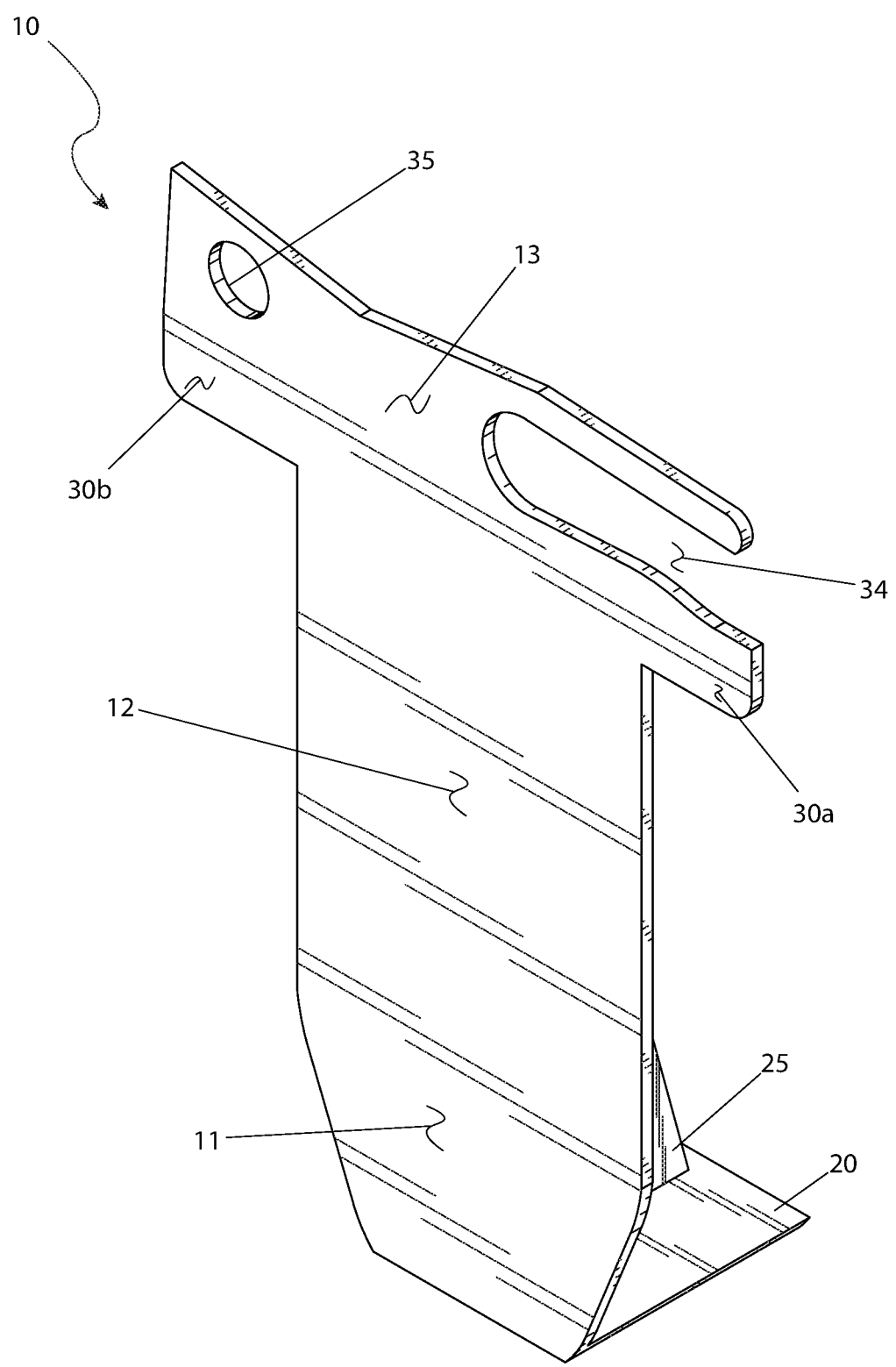
FIG. 1 is a top perspective view of a tire releasing implement 10, according to a preferred embodiment of the present invention.

10 tire releasing implement
11 lower portion
12 center portion
13 upper portion
20 base
25 gusset
30a first upper side
30b second upper side 34 slot
35 aperture
40 vehicle
41 wheel
42 lug
45 jack
50 tire
51 rim

DESCRIPTION OF THE PREFERRED EMBODIMENTS

Figure 2:
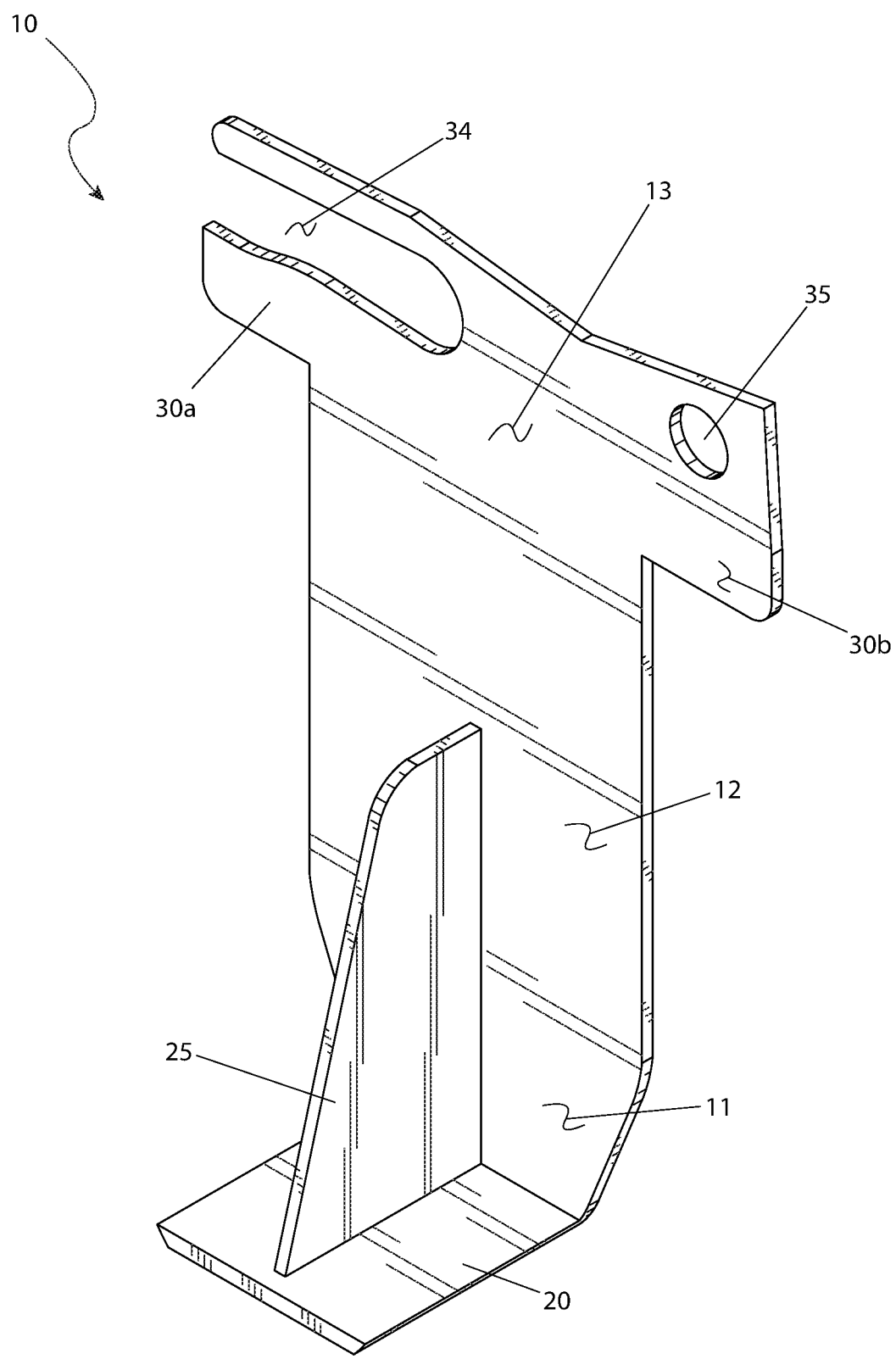
FIG. 2 is a rear perspective view of the tire releasing implement 10, according to a preferred embodiment of the present invention.
Figure 3:
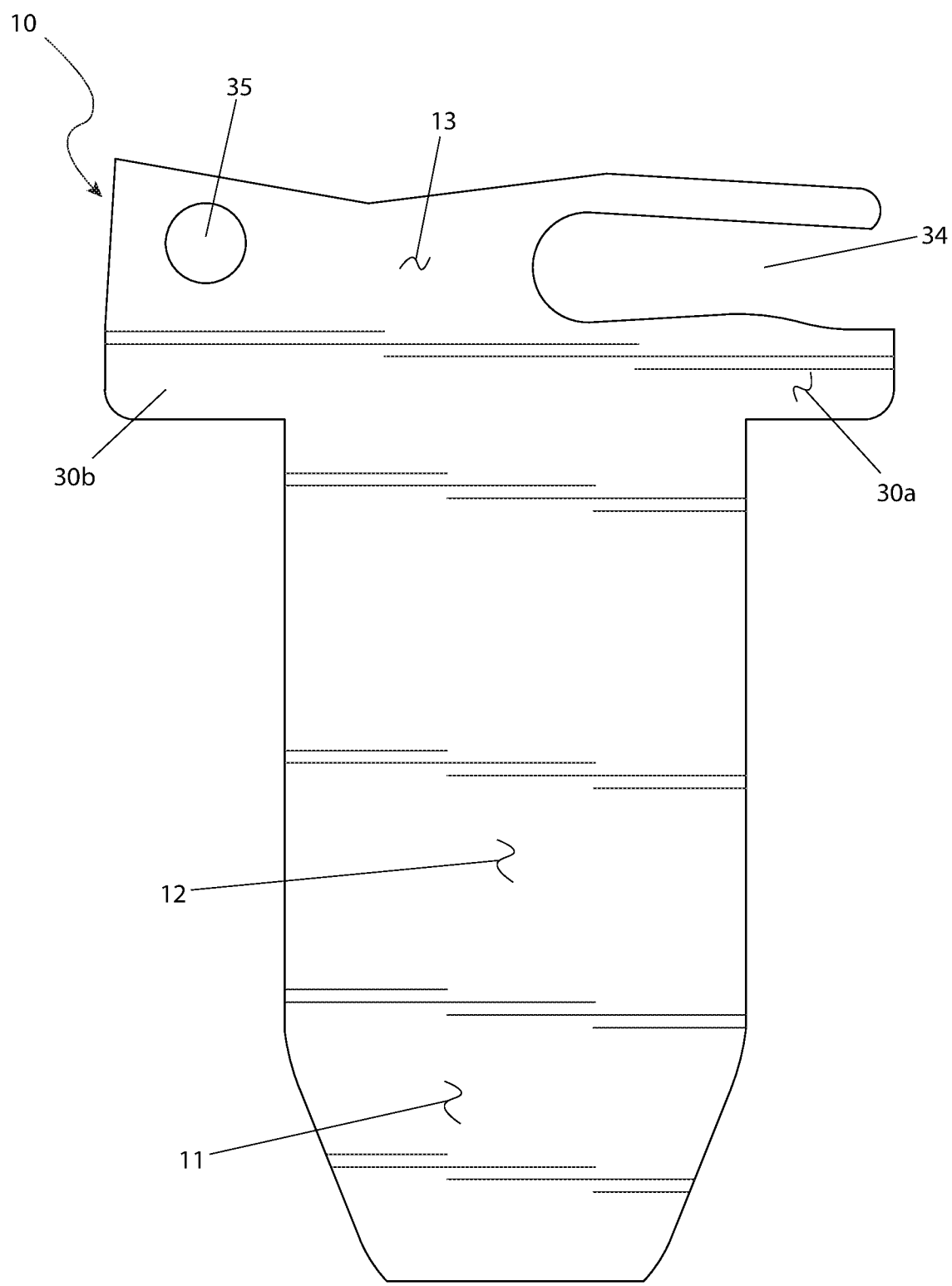
FIG. 3 is a front elevation view of the tire releasing implement 10, according to a preferred embodiment of the present invention.
Figure 4:
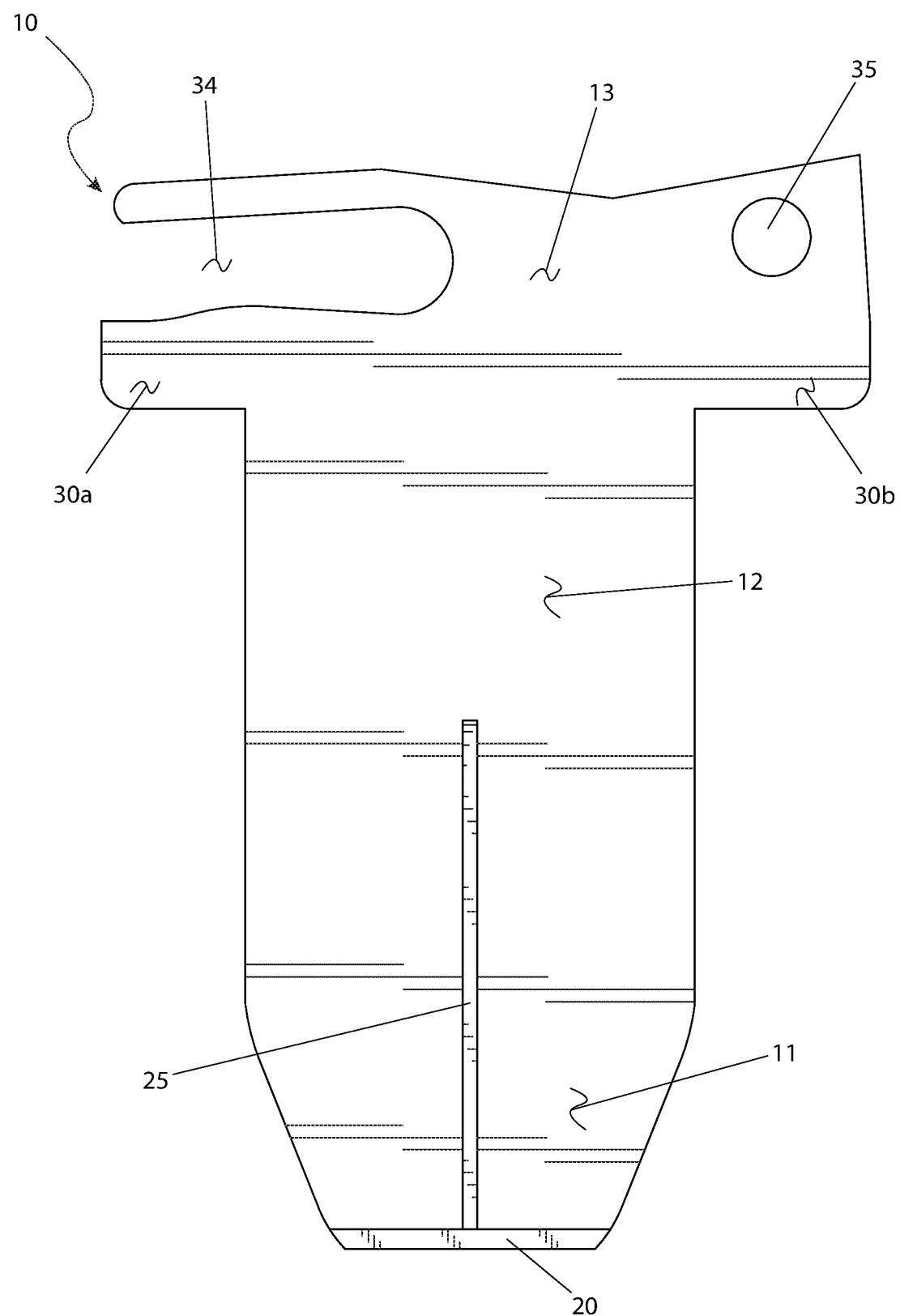
FIG. 4 is a rear elevation view of the tire releasing implement 10, according to a preferred embodiment of the present invention.
Figure 5:
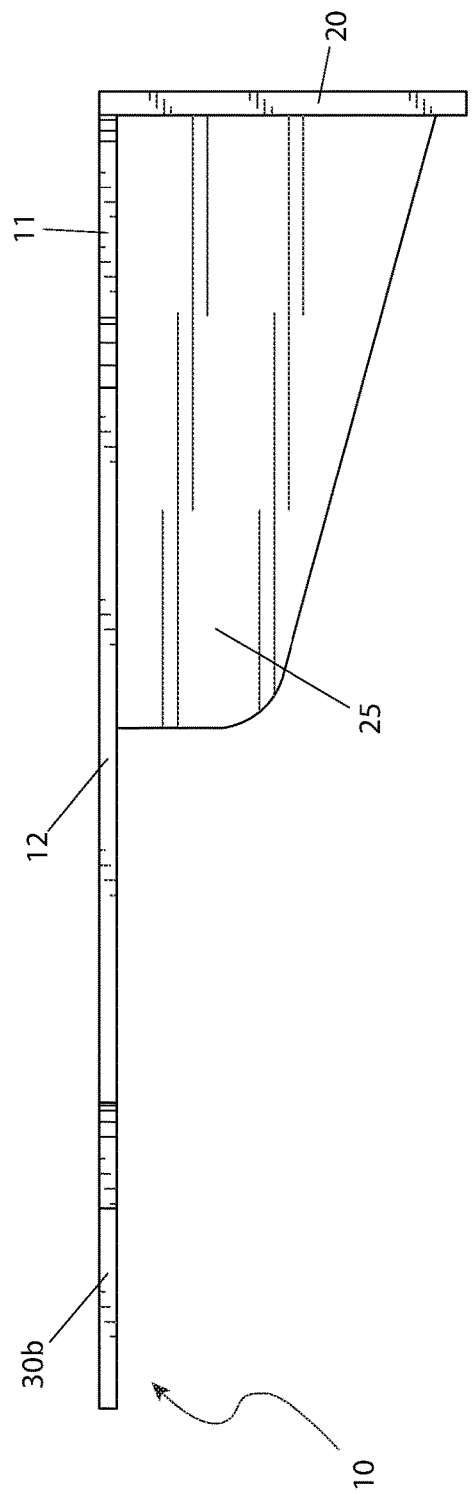
FIG. 5 is a right side elevation view of the tire releasing implement 10, according to a preferred embodiment of the present invention.
Figure 6:
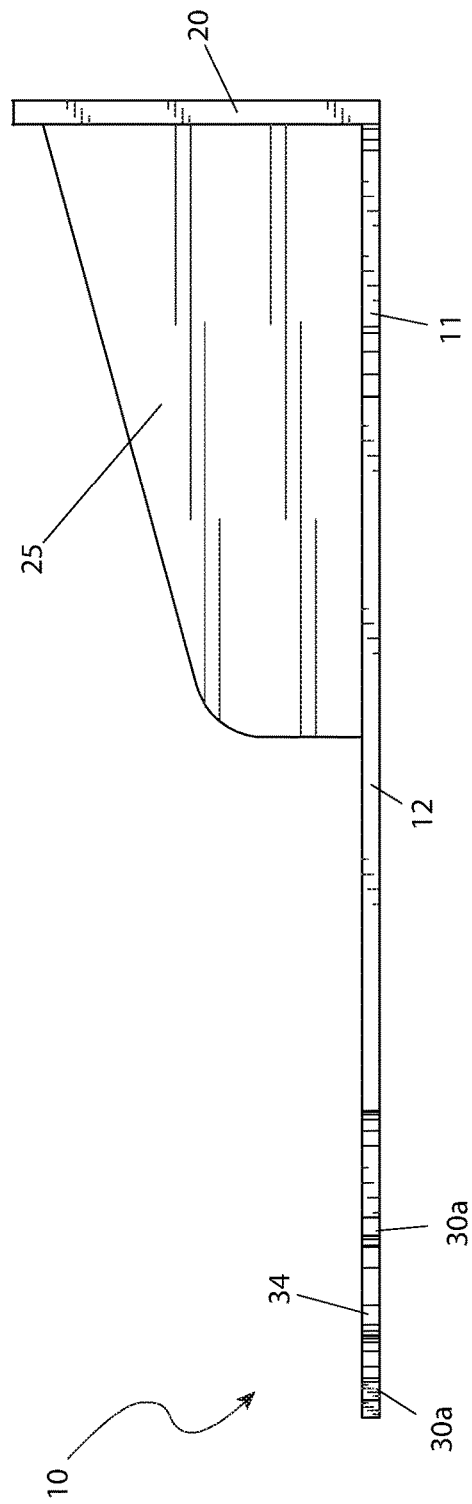
FIG. 6 is a left side elevation view of the tire releasing implement 10, according to a preferred embodiment of the present invention.
Figure 7:
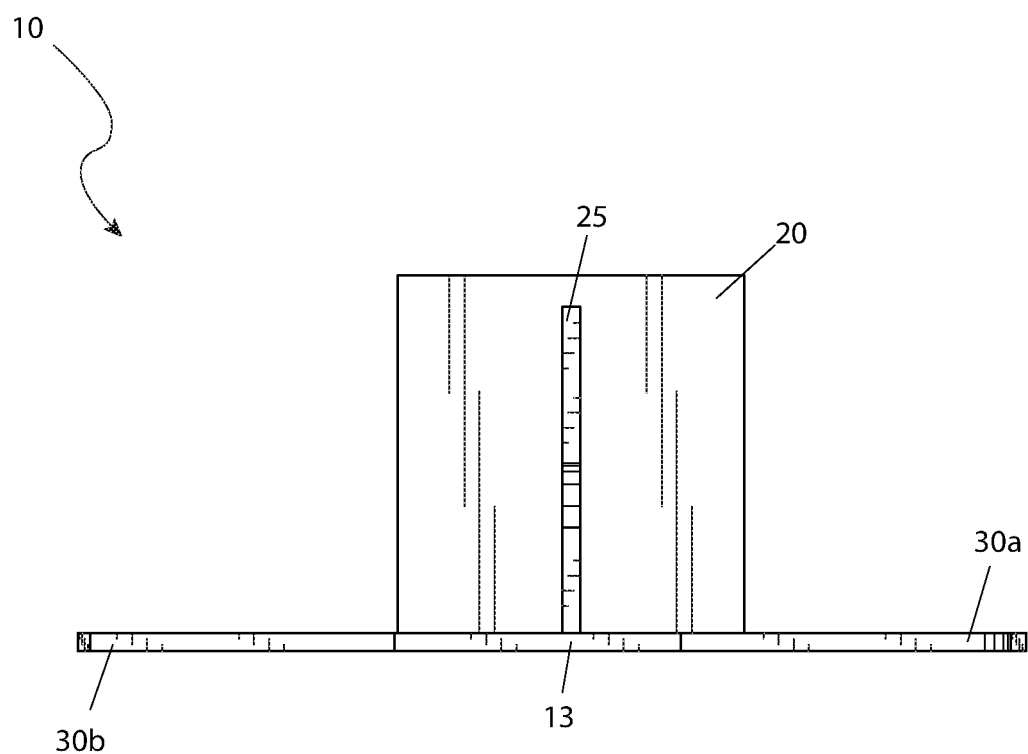
FIG. 7 is a top plan view of the tire releasing implement 10, according to a preferred embodiment of the present invention.
Figure 8:
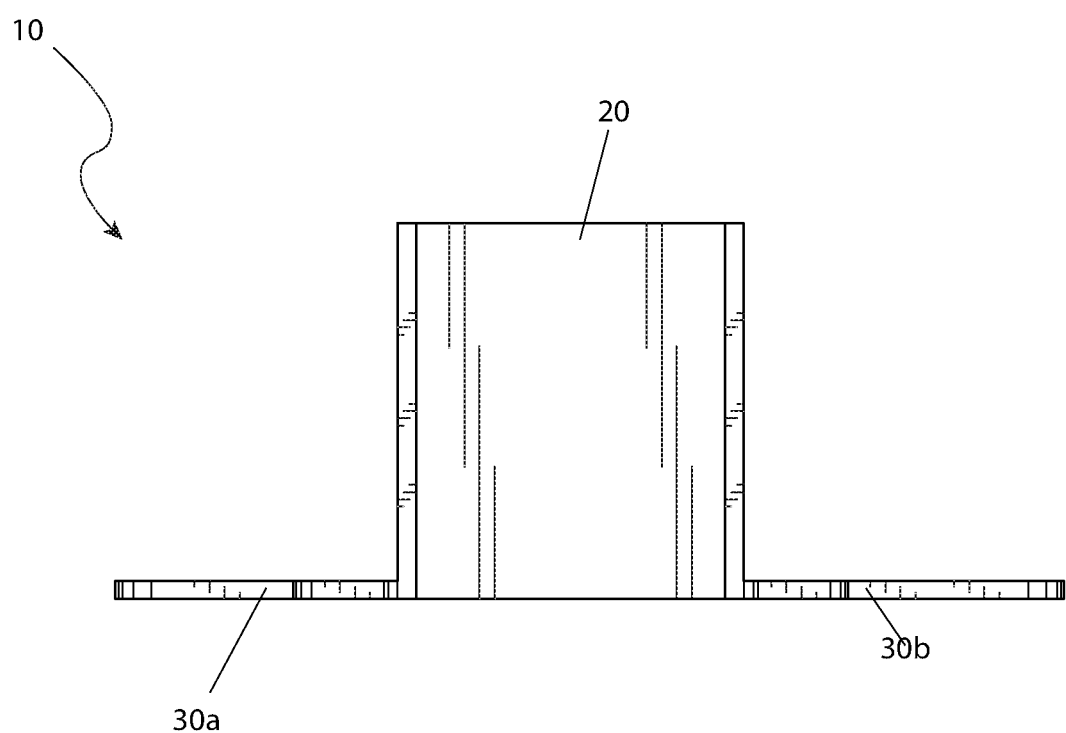
FIG. 8 is a bottom plan view of the tire releasing implement 10, according to a preferred embodiment of the present invention; and, FIG. 9 is an environmental view of the tire releasing implement 10 in removing a tire 50 from a rim 51, according to a preferred embodiment of the present invention.
Figure 9:
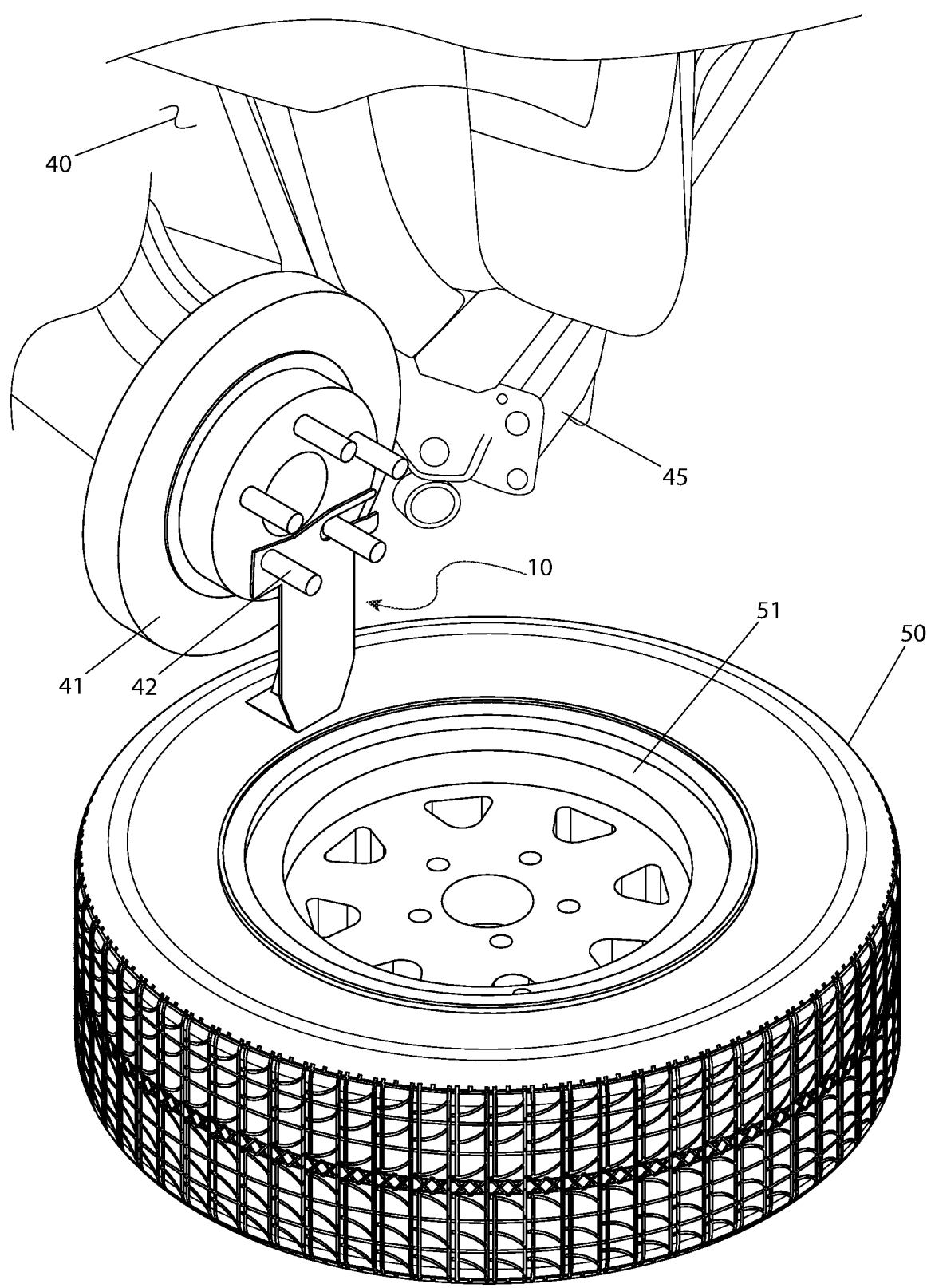

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

The invention herein described refers to a tire releasing implement (herein referred to as the "implement") 10, that assists in removing a tire 50 from a rim 51 after the tire 50 has been removed from the wheel 41 of a vehicle 40. In a preferred, embodiment, the implement 10 is a unitary structural element approximately seven inches (7 in.) in height, four inches (4 in.) in width, and one-quarter inch (¼ in.) in thickness. The implement 10 is preferably a hardened metallic fabrication (such as carbon or stainless steel) and is capable of being used in an inclement environment and capable of withstanding heavy pressure and repeated use.

Referring now to FIGS. 1-8, there is shown the implement 10 in various views. The implement 10 can be describes as having a lower portion 11, a base 20, a center portion 12, and an upper portion 13, each of which is planar. The implement 10 is unitary, where an upper part of the lower portion 11 transitions into the lower part of the center portion 12. Likewise, the upper part of the center portion 12 transitions into the lower part of the upper portion 13. The upper portion 13 further comprises a first upper side 30a and a second upper side 30b, delineated by a bisecting longitudinal axial centerline passing through the implement 10.

The center portion 11 comprises the majority of the implement 10 and is generally rectangular in cross-section. The lower portion 11 depends downward from the center portion 11 and has a pair of sides that tapers inward and terminates at a smaller width than the center portion 12. The base 12 is planar extends rearwardly from the terminal bottom edge of the lower portion 11 approximately one-and-a-half inches (1-½ in.) in length. A planar gusset 25 having a similar thickness as the remainder of the implement 10 is affixed between an upper surface of the base 12 and a rear surface of the implement 10 at the center portion 13. The gusset 25 is located at a bisecting axial centerline of the base 12 and is intended to provide structural rigidity to the implement 10 when in use. The approximate overall length of the center portion 12 and lower portion 11 is six inches (6 in.).

The upper portion 13 has a height of approximately one inch (1 in.) and as aforementioned comprises a first upper side 30a and a second upper side 30b. For purposes of illustration, the first upper side 30a is to the right of a longitudinal axial bisecting centerline of the implement 10 and the second upper side 30b is to the right thereof. The second upper side 30b extends away at a larger width that the terminal edge of the center portion 12 of approximately one inch (1 in.) and the first upper side 30a extends away at a larger width that the terminal edge of the center portion 12 of approximately three-quarter inch (¾ in.). An aperture 35 is located adjacent an upper outer corner of the second upper side 30b and is sized to enable passage of a lug 42 of a wheel 41 therethrough. A slot 34 is located on the outer edge of the first upper side 30b and extends inward to approximately the delineation between the first upper side 30a and the second upper side 30b. The bottom inner edge of the slot 34 is preferably curvilinear to provide guided passage of a lug 42 of a wheel 41 therethrough. The upper edge of the upper portion 13 is discontinuous. The edge tapers down in height from the upper outer corner of the second upper side 30b to a first intermediate point, the tapers upward at a smaller angle to a second intermediate point, then runs parallel to the bottom edge of the lower portion 11 as it terminates at the upper corner of the first upper side 30a. It is preferred that the corners of the first upper side 30a, second upper side 30b, and the slot are gently rounded.

2. Operation of the Preferred Embodiment

The implement 10 is particularly suited for quickly removing the tire 50 from the rim 51. To accomplish this, to prepare the tire 50 and implement 10, the tire 50 must be removed from the vehicle 40. In referring to FIG. 9, a preferred method of accomplishing this may include raising the vehicle 40 with a jack 45 or other lifting mechanism such that the wheel 41 and tire 50 is raised in the air. The lug nuts are then removed from the lugs 42 of the wheel 41 and the tire 50 is removed therefrom. The implement 10 is then placed on the lowermost lugs 42 of the wheel 41 by guiding a first lug 42 through the slot 34 of the first upper side 30a and passing a second lug 42 through the aperture 35 of the second upper side 30b. At this point, the lug nuts may be reattached to the lugs 42 if desired. The tire 50 is then placed on the ground such that the location of where the tire 50 is attached to rim 51 (e.g., the bead) is directly below the lower portion 11 of the implement 10 and air pressure is released from the tire 50.

In order to remove the tire 50 from the rim 51, the jack 45 or other lifting mechanism lowers the vehicle 40 (preferably gently) until the lower portion 11 of the implement 10 engages the bead. The resultant force applied to the bead due to the weight of the vehicle 40 imparted to the implement 10 "breaks" the bead and releases the tire 50 from the rim 51. The vehicle 40 is then raised again via the jack 45 or other lifting mechanism, the tire 50 is rotated so as to provide the same process to the other side.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A tire releasing implement, comprising:
a base extending rearwardly from a terminal bottom edge of a lower portion thereof;
a center portion comprising a majority of the tire releasing implement that is rectangular in cross-section;
an upper portion including a first upper side and a second upper side, the upper portion is delineated by a bisecting longitudinal axial centerline passing through the tire releasing implement;
a planar gusset affixed between an upper surface of the base and a rear surface of the tire releasing implement at the center portion;
an aperture located adjacent to an upper outer corner of the second upper side and is sized to enable passage of a lug of a wheel therethrough; and
a slot located on the outer edge of the first upper side that extends inward to the delineation between the first upper side and the second upper side;
wherein the lower portion is depending downward from the center portion and has a pair of sides that tapers inward and terminates at a smaller width than the center portion.

2. The tire releasing implement according to claim 1, wherein the first upper side is to the right of a longitudinal axial bisecting centerline of the tire releasing implement and the second upper side is to the right thereof.

3. The tire releasing implement according to claim 1, wherein an upper edge of the upper portion tapers down in height from the upper outer corner of the second upper side to a first intermediate point and then tapers upward at a smaller angle to a second intermediate point.

4. The tire releasing implement according to claim 3, wherein the upper edge of the upper portion then runs parallel to a bottom edge of the lower portion as it terminates at the upper corner of the first upper side.

5. The tire releasing implement according to claim 1, wherein the lower portion is planar.

6. The tire releasing implement according to claim 1, wherein the base is planar.

7. The tire releasing implement according to claim 1, wherein the center portion is planar.

8. The tire releasing implement according to claim 1, wherein the upper portion is planar.

9. The tire releasing implement according to claim 1, wherein the planar gusset is located at a bisecting axial centerline of the base and is intended to provide structural rigidity to the tire releasing implement when in use.

10. The tire releasing implement according to claim 1, wherein the planar gusset has the same thickness as the tire releasing implement.

11. The tire releasing implement according to claim 1, wherein a bottom inner edge of the slot is curvilinear to provide guided passage of the lug of the wheel therethrough.

12. The tire releasing implement according to claim 1, wherein a corners of the first upper side, second upper side, and the slot are gently rounded.

13. The tire releasing implement according to claim 1, wherein the tire releasing implement is a unitary structural element.

14. The tire releasing implement according to claim 13, wherein the unitary structural element includes an upper part of the lower portion that transitions into a lower part of the center portion.

15. The tire releasing implement according to claim 1, wherein an upper part of the center portion transitions into a lower part of the upper portion.

16. The tire releasing implement according to claim 1, wherein the tire releasing implement is a hardened metallic fabrication.

17. The tire releasing implement according to claim 16, wherein the hardened metallic fabrication is carbon steel.

18. The tire releasing implement according to claim 16, wherein the hardened metallic fabrication is stainless steel.

19. The tire releasing implement according to claim 1, wherein the tire releasing implement is seven inches in height, four inches in width, and one-quarter inch in thickness.

* * * * *